United States Patent
Friebe et al.

(10) Patent No.: US 11,086,027 B2
(45) Date of Patent: Aug. 10, 2021

(54) DETECTOR STRIP FOR X-RAY FILM

(71) Applicant: VISUS Health IT GmbH, Bochum (DE)

(72) Inventors: Michael Friebe, Recklinghausen (DE); Alfredo Illanes Manriquez, Magdeburg (DE); Ali Pashazadeh, Magdeburg (DE); Peter Rosiepen, Bochum (DE)

(73) Assignee: VISUS Health IT GmbH, Bochum (DE)

( * ) Notice: Subject to any disclaimer, the term of this patent is extended or adjusted under 35 U.S.C. 154(b) by 0 days.

(21) Appl. No.: 16/467,995

(22) PCT Filed: Dec. 8, 2017

(86) PCT No.: PCT/EP2017/081954
§ 371 (c)(1),
(2) Date: Jun. 10, 2019

(87) PCT Pub. No.: WO2018/104497
PCT Pub. Date: Jun. 14, 2018

(65) Prior Publication Data
US 2019/0302277 A1     Oct. 3, 2019

(30) Foreign Application Priority Data
Dec. 8, 2016   (DE) ............... 10 2016 123 846.5

(51) Int. Cl.
*G01T 1/08* (2006.01)
*G01T 1/10* (2006.01)
*G01N 23/04* (2018.01)

(52) U.S. Cl.
CPC ............ *G01T 1/08* (2013.01); *G01T 1/10* (2013.01); *G01N 23/04* (2013.01)

(58) Field of Classification Search
CPC .............. G01T 1/08; G01T 1/10; G01N 23/04
See application file for complete search history.

(56) References Cited

U.S. PATENT DOCUMENTS 3,932,756 A * 1/1976 Cowell ................. A61B 6/14
                                                  250/361 R
4,053,774 A * 10/1977 Berdahl ............. A61B 6/502
                                                  378/97

(Continued)

FOREIGN PATENT DOCUMENTS

EP      0779521      6/1997
EP      0849980      6/1998

(Continued)

OTHER PUBLICATIONS

Internationaler Recherchenbericht and Schriftlicher Bescheid [International Search Report and the Written Opinion] dated Apr. 23, 2018 From the International Searching Authority Re. Application No. PCTEP2017/081954 and Its Translation of Search Report Into English.

(Continued)

*Primary Examiner* — Marcus H Taningco

(57) ABSTRACT

The invention relates to a system (1) for detecting image parameters during the exposure of films (2), in particular X-ray films. It is an object of the invention to provide a system which allows a simple and fast production of optimally exposed recordings. For this purpose, the system (1) comprises a detector element (3) which can be detachably attached to a film (2) and which detects in a spatially resolved manner the radiation (4) impinging on the film (2) during exposure or the radiation (4) transmitted through the film and thereby generates a signal from which image parameters generated by the current film exposure can be derived.

8 Claims, 2 Drawing Sheets

(56) References Cited

U.S. PATENT DOCUMENTS

| | | | | |
|---|---|---|---|---|
| 4,188,537 A * | 2/1980 | Franke | ............... | A61B 6/14 378/146 |
| 4,455,669 A * | 6/1984 | Aichinger | ............... | A61B 6/032 378/157 |
| 4,856,040 A * | 8/1989 | Geluk | ............... | A61B 6/032 378/146 |
| 5,035,239 A * | 7/1991 | Edwards | ............... | G01L 9/0077 128/205.23 |
| 5,585,638 A * | 12/1996 | Hoffman | ............... | G01T 1/2018 250/370.07 |
| 5,694,449 A * | 12/1997 | Aragones | ............... | H05G 1/44 378/105 |
| 5,966,425 A * | 10/1999 | Beland | ............... | H02M 7/1557 378/108 |
| 6,693,675 B1 * | 2/2004 | Abe | ............... | H04N 5/2256 348/207.99 |
| 2002/0172325 A1 * | 11/2002 | Bakalyar | ............... | G01N 23/04 378/62 |
| 2006/0269041 A1 * | 11/2006 | Mertelmeier | ............... | A61B 6/502 378/37 |
| 2007/0036272 A1 * | 2/2007 | Johansson | ............... | A61B 6/542 378/108 |
| 2011/0205535 A1 * | 8/2011 | Soller | ............... | A61B 5/145 356/300 |
| 2014/0357988 A1 * | 12/2014 | Grass | ............... | A61N 5/1071 600/424 |
| 2019/0082978 A1 * | 3/2019 | Van Der Horst | ............... | A61B 5/0285 |

FOREIGN PATENT DOCUMENTS

| | | |
|---|---|---|
| WO | WO 2007/034033 | 3/2007 |
| WO | WO 2018/104497 | 6/2018 |

OTHER PUBLICATIONS

Kuo et al. "Flexible X-Ray Imaging Detector Based on Direct Conversion in Amorphous Selenium", Journal of Vacuum Science and Technology, Part A, XP012186305, 32(4): 041507-1-041507-6, Published Online Jun. 10, 2014.

* cited by examiner

DETECTOR STRIP FOR X-RAY FILM

RELATED APPLICATIONS

This application is a National Phase of PCT Patent Application No. PCT/EP2017/081954 having International filing date of Dec. 8, 2017, which claims the benefit of priority German Patent Application No. 10 2016 123 846.5 filed on Dec. 8, 2016. The contents of the above applications are all incorporated by reference as if fully set forth herein in their entirety.

FIELD AND BACKGROUND OF THE INVENTION

The invention relates to a system for acquiring image parameters during the exposure of films, in particular X-ray films.

Such X-ray films are frequently used in the field of non-destructive testing (NDT). Non-destructive testing is a discipline that uses non-invasive techniques to examine the condition of materials and structures. The main task of non-destructive testing is to reveal faults or defects and to provide clues as to whether the fault or defect is significant with regard to the operational safety and/or the reliability of the examined object.

Non-destructive testing uses many different technologies and methods. One of the most commonly used technologies for volumetric testing is radiography. In particular, X-rays or gamma rays are used here to generate a radiographic image of the object to be tested. The penetrating radiation is used to visualize the internal structure of solid and hard materials such as steel or other metals or even concrete. In the conventional testing method, a radiation source (gamma/X-ray radiation) is located on one side of the examination object and a radiation-sensitive film is located on the other side of the examination object in order to detect the radiation penetrating the examination object. This allows the visualization of the examination object with respect to differences in thickness, changes in the structure or other internal defects or faults.

In film-based radiography using gamma-radioisotopes such as Co-60 or Cs-137, images are generated by a chemical interaction of the photons with the film material. For this, the film consists of a gelatin emulsion containing radiation-sensitive silver halide crystals and a flexible, transparent, blue-tinted base. When the energetic photons impinge on the radiation-sensitive silver halide crystals, a chemical interaction takes place inside the film material, which leads to the exposure of the film.

Since the chemical substances in X-ray films are sensitive to radiation, overexposure of the film can easily occur, which deteriorates the quality of the final image. This overexposure can cause the film to become too dark and the recorded image to be unusable. An underexposure of the film, on the other hand, can also result in an unusable image since the desired details of the examination object are not visible on the image. In order to obtain sufficiently detailed information from the examination object, it is necessary that the exposure of the film be terminated after an appropriate time (exposure time). The correct exposure time depends on the examination object and the radiation source used and is often difficult to determine in practice.

The quality of an X-ray image and thus the detectability of defects and faults of the examination object depend mainly on the contrast, the sharpness and the graininess of the image. These are the basic image parameters that determine the quality of an X-ray image. These parameters have a great influence on the traceability of defects and faults in a test object. While the sharpness and graininess are mainly dependent on the test set-up and the quality of the film, the contrast depends strongly on the radiation energy and the duration of the exposure. The required radiation energy and the necessary exposure time depend on further factors which can influence the image quality and thus the detectability of defects and faults.

Today, the method of non-destructive testing based on X-ray images using a gamma source and a photographic film is dependent on the arrangement of the radiation source and the film and the exposure time, wherein the operator must maintain a safe distance to the examination object and the testing device during exposure.

Some of these testings are run over a long period of time, due in part to very large objects and thus a correspondingly small number of gamma photons recorded by the film. The known methods very often use nuclide-based radiation sources and analog films.

Only after the exposure can the operator process (develop and digitize) the exposed film to perform the image analysis and find defects and faults of the examination object. It is only at this point in time that it is possible to ascertain whether the image material obtained is suitable for analyses with non-destructive testing or whether a new recording having changed parameters is required.

SUMMARY OF THE INVENTION

The invention thus faces the problem of providing a system which overcomes the disadvantages described and allows a simple and rapid production of optimally exposed recordings and allows a possibility to predict the optimal exposure time.

According to the invention, this problem is achieved by a system having the features of patent claim 1.

According to the invention, the system for acquiring image parameters during the exposure of films, in particular X-ray films, comprises a detector element which can be detachably attached to a radiation-sensitive film (for example, on the rear side of the film facing away from the radiation source used or on the front or rear side of a cassette accommodating the film) and detects the radiation incident on the film during exposure or the radiation transmitted through the film in a spatially resolved manner, thereby generating a signal from which image parameters generated by the current exposure can be derived.

Due to the high importance of the exposure time and its influence on the image quality, the real-time monitoring of the generated image parameters according to the invention during the current exposure is of great advantage. Not only can this reduce costs by avoiding erroneously exposed films, but it can also reduce the time of component examination since repetitive recordings are not necessary.

The system proposed here relates in particular to X-ray non-destructive testing and, in particular, to the use of X-ray films. There is a particular need here for real-time monitoring of the image quality, in particular the image contrast. The basic idea of the proposed solution is to attach the (if possible digital) detector element to a simple film and thereby create a real-time monitoring solution. With such a system for real-time digital data acquisition and processing, there can be an automatic detection of when the image quality in the film, in particular the contrast, is optimal. Thus, the exposure can be automatically finished at just the right time.

The detachable attachability of the detector element to the film makes it possible to use the detector element for a plurality of recordings over and over again, each with new film material. The attachment to the film provides for fixation to the film during the exposure.

Advantageous embodiments and further developments of the invention result from the dependent claims.

According to an advantageous embodiment of the invention, it is provided that the image contrast generated by the current exposure on the film can be derived from the signal generated by the detector element. By obtaining real-time information about the currently achieved image contrast, the exposure can be controlled to achieve optimal results from the recordings.

An advantageous embodiment is that the detector element is connected to an evaluation system. The evaluation system connected to the detector element performs the derivation of the image parameters from the measurement signals and enables monitoring of the exposure based thereon.

A preferred embodiment provides that the evaluation system analyzes local exposure differences based on the signals of the detector element. Based on the local exposure differences, the quality of the recording can be evaluated during the exposure.

Particularly advantageous is the development that the evaluation system generates a message as soon as it is foreseeable that the image quality corresponds to predeterminable criteria. The immediate feedback from the evaluation system allows it to intervene in time to achieve optimum image quality, for example, in order to end the exposure. The user on site must be able to cancel or end the exposure. This can be done by the complete radiation shielding of the radiation source, so that no more gamma photons arrive at the detector element. However, it could also be a lead element mechanically or electrically drawn over the film.

It is also advantageous that the evaluation system automatically interrupts the exposure of the film as soon as the image quality corresponds to predeterminable criteria. The automatic interruption of the recording when predetermined parameters are reached (for example, with regard to contrast or total dose) makes it easier to create images and reduces the necessary experience of the operating personnel.

A further advantageous embodiment of the invention provides that the evaluation system is connected to a communication unit which transmits results of the evaluation system to external devices. The preferably wireless connection of the evaluation system to an external device facilitates the operation of the system. In this way, the evaluation system can be read or operated with an adequate safety margin via an external device.

According to an advantageous embodiment of the invention, it is provided that the detector element comprises a plurality of digital radiation sensors, for example, in an array arrangement. The digital design of the detector element enables the electronic evaluation and further processing of the measurement signals in real time. The costs of digital sensors are not very relevant since the detector element can be used as often as desired. The additional costs are overcompensated by the savings resulting from the benefit of the system according to the invention (avoidance of defective exposures).

An advantageous embodiment is that the detector element is configured as an elongate strip. The strip-shaped design of the detector element offers the possibility of acquiring a narrow, stripe-shaped section of the film exposure. A one-dimensional array of digital radiation sensors can advantageously be arranged on the strip. The recording of a thus so-to-speak one-dimensional digital image during the film exposure is sufficient to assess the image quality (in particular with regard to the achieved contrast).

A preferred embodiment provides that the strip extends along its length over the entire film. The extension of the detector element over the entire exposed area of the film in one direction makes it possible to adequately acquire the image parameters during the exposure. When recording, the strip is arranged on the film as much as possible so that the intensity fluctuations along the strip's course are maximal. This enables the reliable evaluation of the image quality based on the one-dimensional digital image delivered by the strip-shaped detector element.

Particularly advantageous is the development of the strip being flexible. The flexible design of the detector element makes the handling, for example, the attachment of the strip to the film particularly simple. In addition, the flexible strip can be stowed away to save space. Furthermore, the strip can be used even when the film has an arbitrarily curved or bent shape during the exposure.

Preferably, the system comprises a power supply. It is of particular advantage here if the power supply is self-sufficient by means of an accumulator, so that the system can be used regardless of the local conditions on the examination object.

BRIEF DESCRIPTION OF THE SEVERAL VIEWS OF THE DRAWINGS

Further features, details and advantages of the invention are apparent from the following description and from the drawings. Exemplary embodiments of the invention are shown purely schematically in the following drawings and are described in more detail below. Corresponding objects or elements are provided with the same reference characters in all figures. Shown are in.

DESCRIPTION OF SPECIFIC EMBODIMENTS OF THE INVENTION

Figure 1:
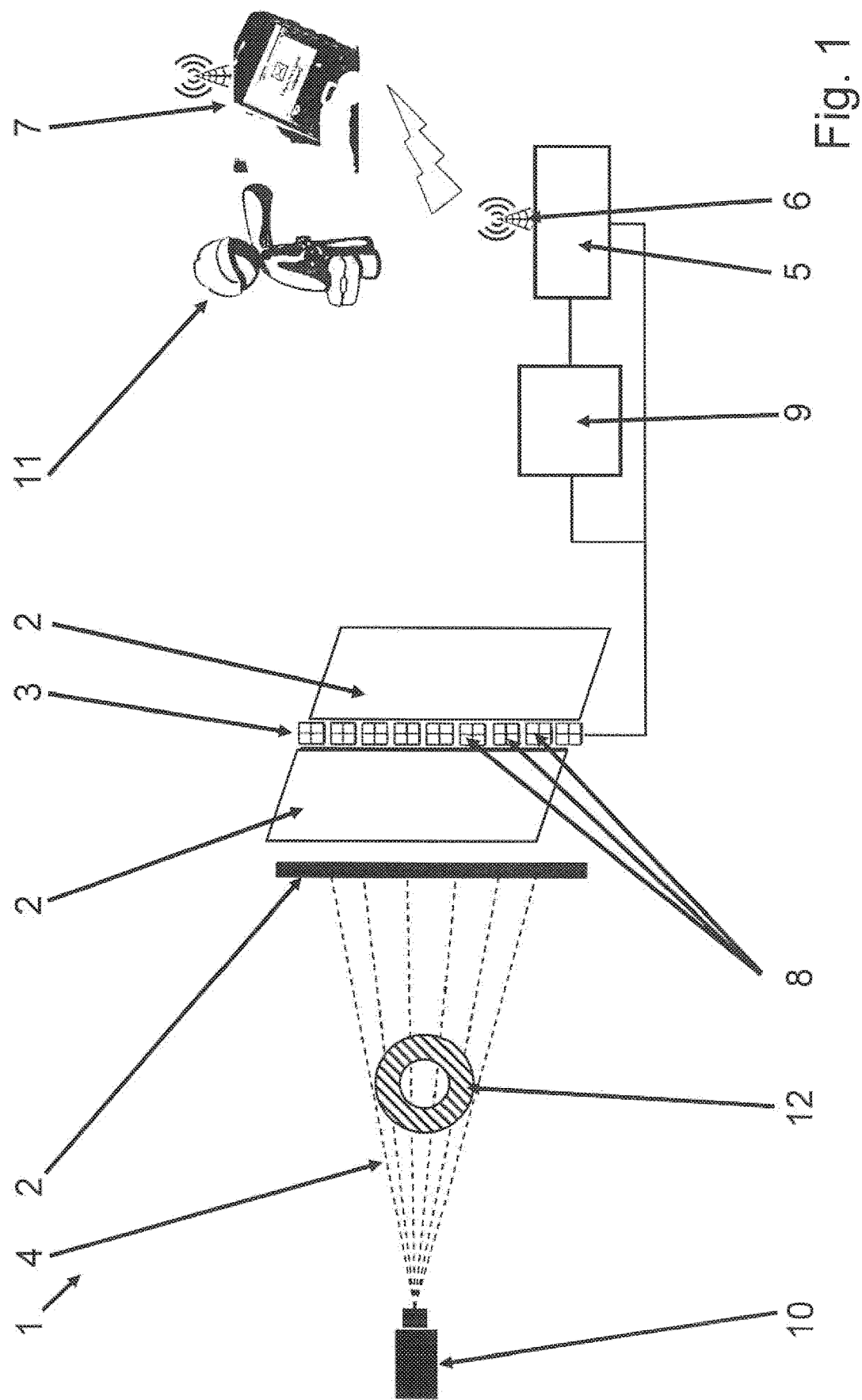
FIG. 1 a schematic representation of the system according to the invention.

Designated by the reference character 1 in FIG. 1 is a system 1 for acquiring image parameters during the exposure of films 2, in particular X-ray films. The representation according to FIG. 1 shows a radiation source 10, from which radiation 4 is emitted in the direction of examination object 12 and film 2. During the exposure of the film 2, the radiation 4 of the radiation source 10 penetrates the examination object 12, wherein a part of the radiation 4 is absorbed by the examination object 12. As a result, after sufficient exposure of the film 2, the contour and also the internal structure of the examination object 12 can be recognized on the recording. This is the known principle of film-based X-ray imaging for non-destructive testing.

As mentioned above, exposure is critical for achieving optimal image quality. For this reason, the system according to the invention has a digital detector element 3 which can be attached to the film 2 (for example, by adhesion or by clamping by means of suitable holding elements) and which detects the radiation 4 impinging on the film 2 during the exposure and generates a signal therefrom, which makes it possible to deduce the image parameters achieved during the exposure. In particular, these image parameters comprise the contrast generated on the film 2 by the exposure. The detector element 3 is connected to an evaluation system 5, which evaluates the signals of the detector element 3. In this case, the evaluation system 5 analyzes in particular local differences in exposure of the radiation acquired by the detector element 3. On the basis of these evaluations, the evaluation system 5 transmits a message to an operator as soon as the image quality corresponds to the image parameters predefined by the operator. The evaluation system 5 can also automatically interrupt the exposure of the film 2 as soon as the image quality corresponds to the image parameters desired by the operator. A communication unit 6 is also connected to the evaluation system 5, which communication unit transmits the results of the evaluation system 5 to external devices 7 (for example, smart phones or laptops) via a wireless connection. In addition, the evaluation system 5 and possibly also the radiation source 10 can be remotely controlled via the external devices 7.

It can be clearly seen in FIG. 1 that the detector element 3 is configured as a strip that extends in a direction over the entire exposed film region. The detector element 3 has a plurality of spatially distributed digital radiation sensors 8, which for reasons of clarity are only individually provided with reference characters. The radiation sensors 8 are, for example, scintillator crystals having these respectively associated photodetectors or X-ray-sensitive semiconductor elements of a known type, as used, for example, in medical X-ray imaging. The system 1 has a self-sufficient power supply 9, so that the non-destructive testing of arbitrary objects (for example, building or machine parts) is flexibly possible on site. The detector element 3, the evaluation system 5 and the communication unit 6 are to be designed as small and compact as possible for optimal attachment to the film. These components then require only a very low power requirement with low voltages (<50V).

Figure 2:
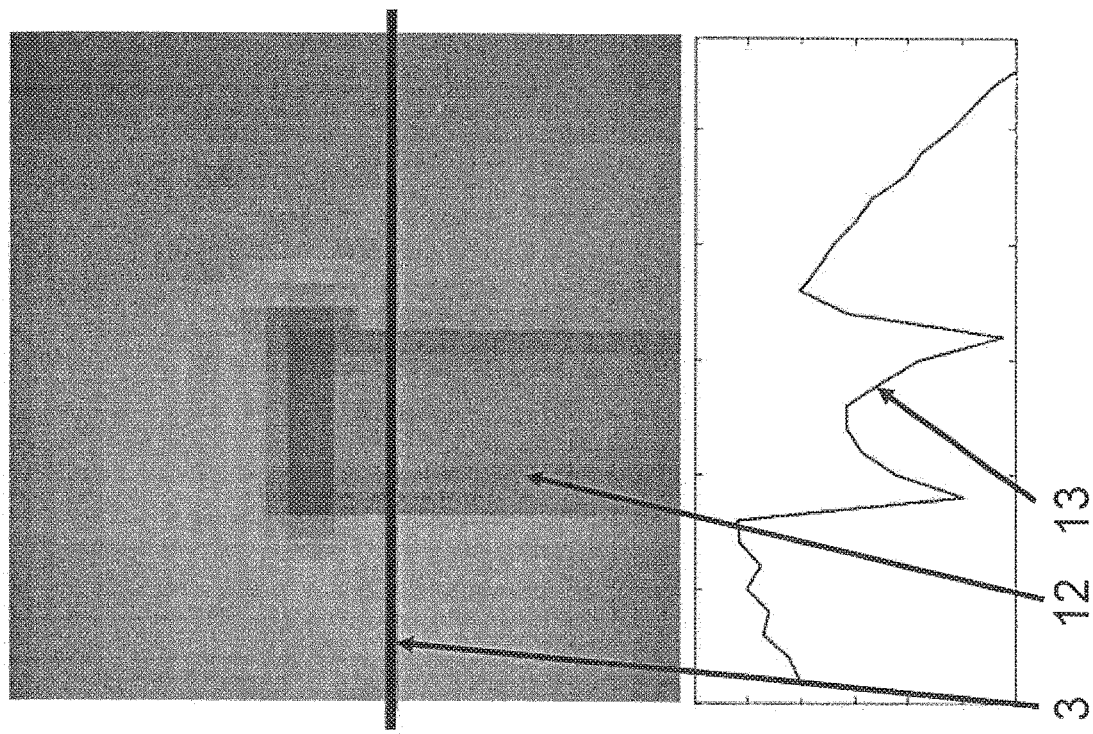
FIG. 2 X-ray images with profile lines.
Figure 2:
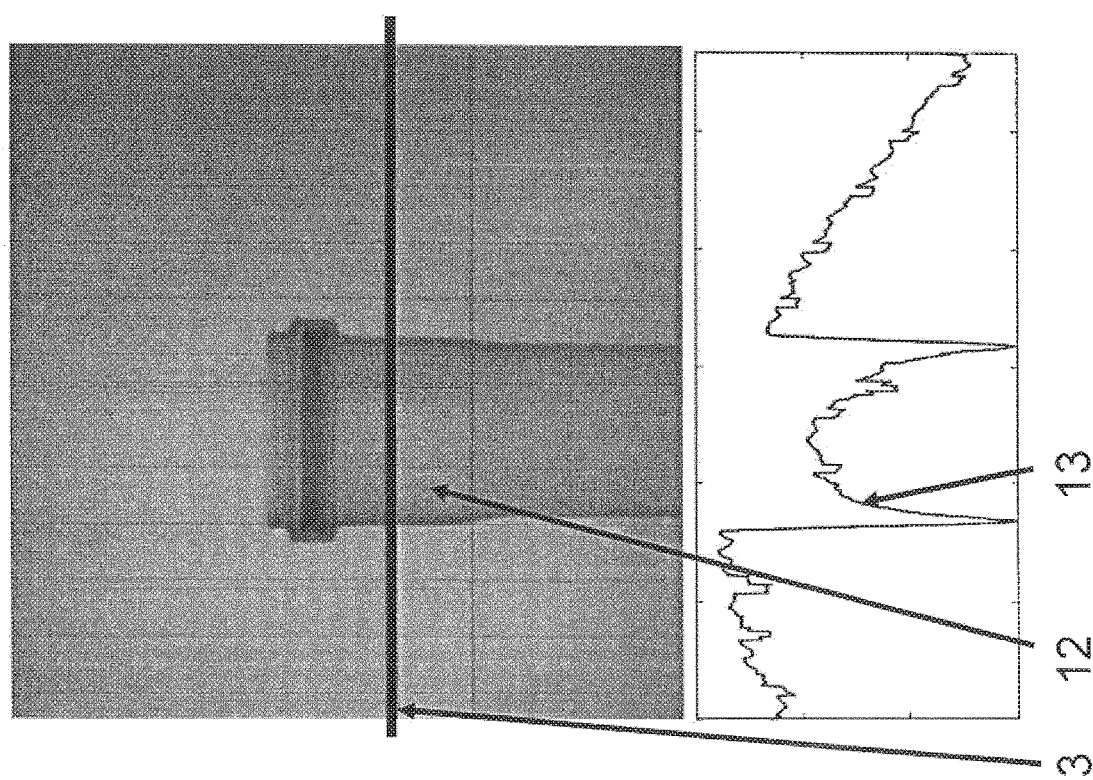

FIG. 2 shows by way of example two image recordings (left and right) to which the image parameters are acquired by means of the system 1 according to the invention (FIG. 1). The strip-shaped detector element 3 is arranged in these recordings in the center of the image for acquiring an image line, as indicated by the black line in the recordings. By acquiring the radiation 4 (FIG. 1) impinging on the film 2 (FIG. 1), a signal is generated which is visualized by the line profile 13 shown under the recordings. The data obtained by the detector element 3 are considered as a line profile signal 13 from the image for examining local differences. The recordings monitored by the system 1 (FIG. 1) show a digital X-ray image of a plastic tube. The strip-shaped detector element 3 provided (one-dimensional) spatially resolved information for exposure. The original digital radiograph with associated line profile 13 is shown below on the left side of FIG. 2. An undersampled version of the digital image is shown at 2% of the original image size on the right side of FIG. 2. A corresponding acquired line profile 13 is located below this recording. As can be clearly seen from the line profiles 13, the radiation 4 (FIG. 1) is absorbed more strongly in the region of the examination object 12, so that locally less incident radiation is measured by the detector element 3. Various indicators can be taken into account in order to quantify whether the image quality corresponds to the specifications based on the signals acquired by the detector element 3. Possible indicators arise from the slope and the curvature of the line profile 13. On the basis of these two indicators, the evaluation system 5 (FIG. 1) can decide whether there are sufficient intensity changes of the signal measured along the strip, from which it is possible to make conclusions about the image contrast. In addition, the line profile 13 can be automatically segmented to determine different segments which are to be associated with the image content of interest or the background. For example, abrupt intensity changes in the image can be identified by applying the known CUSUM test to the data series given by the line profile 13. This allows the image quality to be quantified. This evaluation allows the evaluation system 5 (FIG. 1) to generate a message or to automatically interrupt the exposure as soon as the image quality corresponds to predetermined target values.

The comparison of the two differently spatially resolved line profiles 13 shows that for the detector element 3, a sensor array of low resolution (by a multiple lower than the resolution of the film recording), is sufficient to assess the image quality with sufficient reliability, that is, with only a few discrete sensor elements 8.

The system described herein provides a predictive capability to predict the exposure at a later time based on the progress of the exposure at the current time in a comparison. This makes it possible to deduce when the exposure is not only good and sufficient, but optimal.

LIST OF REFERENCE CHARACTERS 1 system
2 film
3 detector element
4 radiation
5 evaluation system
6 communication unit
7 external device
8 radiation sensors
9 power supply
10 radiation source
11 operator
12 examination object
13 profile line

What is claimed is:

1. A system (1) for the acquisition of image parameters during the exposure of an X-ray film (2) the system (1) having a detector element (3), the detector element (3) adapted for detecting radiation (4) incident on the X-ray film (2) during the exposure or the radiation (4) transmitted through the X-ray film with spatial resolution;
   wherein the detector element (3) having a flexible elongated band adapted to extend along the X-ray film and to be detachably attached to the X-ray film (2);
   wherein the detector element (3) generates a signal encoding image parameters of the X-ray film exposure based on the detected radiation (4).

2. The system (1) according to claim 1, wherein the image parameters comprises an image contrast value generated by the current exposure on the X-ray film (2).

3. The system (1) according to claim 2, wherein the signal is evaluated by an evaluation system (5) that analyzes the signal to determine local exposure differences.

4. The system (1) according to claim 2, wherein an evaluation system (5) receives the signal and generates a message as soon as the image quality meets pre-definable criteria.

5. The system (1) according to claim 2, wherein an evaluation system (5) automatically interrupts the exposure of the X-ray film (2) as soon as the image quality meets predeterminable criteria.

6. The system (1) according to claim 2, wherein an evaluation system (5) is connected to a communication unit (6) which transmits results of the evaluation system (5) to external devices (7).

7. The system (1) according to claim 1, wherein the detector element (3) comprises a plurality of digital radiation sensors mounted along the flexible elongated band.

8. The system (1) according to claim 1, wherein the detector element (3) is connected to an evaluation system (5).

* * * * *